United States Patent
Tsujino (10) Patent No.: US 9,361,063 B2
(45) Date of Patent: Jun. 7, 2016

(54) FUNCTION EXECUTION INSTRUCTION SYSTEM, FUNCTION EXECUTION INSTRUCTION METHOD, AND FUNCTION EXECUTION INSTRUCTION PROGRAM

(71) Applicant: NTT DOCOMO, INC., Chiyoda-ku (JP)

(72) Inventor: Kosuke Tsujino, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/395,851

(22) PCT Filed: May 28, 2013

(86) PCT No.: PCT/JP2013/064767
§ 371 (c)(1),
(2) Date: Oct. 21, 2014

(87) PCT Pub. No.: WO2013/190957
PCT Pub. Date: Dec. 27, 2013

(65) Prior Publication Data
US 2015/0142448 A1    May 21, 2015

(30) Foreign Application Priority Data

Jun. 19, 2012 (JP) .................................. 2012-137844

(51) Int. Cl.
*G10L 15/00* (2013.01)
*G06F 3/16* (2006.01)
(Continued)

(52) U.S. Cl.
CPC ............... *G06F 3/167* (2013.01); *G10L 15/22* (2013.01); *G10L 15/19* (2013.01); *G10L 2015/223* (2013.01)

(58) Field of Classification Search
CPC .......................... G10L 15/265; G10L 15/1815
USPC ........................................................ 704/275
See application file for complete search history.

(56) References Cited

U.S. PATENT DOCUMENTS 8,359,190 B2 *  1/2013  Kirshenbaum ..... G06F 17/2785
                                                         704/10
8,762,156 B2 *  6/2014  Chen ..................... G10L 15/26
                                                         704/10

(Continued)

FOREIGN PATENT DOCUMENTS

| JP | 2000-356999 | 12/2000 |
| JP | 2003-162524 A | 6/2003 |
| JP | 2003-202888 | 7/2003 |
| JP | 2009-198871 | 9/2009 |
| JP | 2011-49885 | 3/2011 |

OTHER PUBLICATIONS

International Search Report issued Aug. 6, 2013, in PCT/JP13/64767 filed May 28, 2013.

(Continued)

*Primary Examiner* — Daniel Abebe
(74) *Attorney, Agent, or Firm* — Oblon, McClelland, Maier & Neustadt, L.L.P.

(57) ABSTRACT

To appropriately execute a function based on a plurality of words, a function-execution instruction server of a function-execution instruction system includes: a function-execution instruction unit that issues an instruction of the execution of one or more tasks; a word input unit that inputs information containing a plurality of words that are arranged in order; and an executed-function determination unit that determines a task the execution of which is instructed on the basis of the order of words input.

7 Claims, 6 Drawing Sheets

(51) Int. Cl.
*G10L 15/22* (2006.01)
*G10L 15/19* (2013.01)

(56) References Cited

U.S. PATENT DOCUMENTS

| | | | |
|---|---|---|---|
| 2003/0046088 A1* | 3/2003 | Yuschik | G10L 15/1822 704/276 |
| 2003/0130852 A1 | 7/2003 | Tanaka et al. | |
| 2004/0220797 A1* | 11/2004 | Wang | G06F 17/2705 704/9 |
| 2005/0038650 A1* | 2/2005 | Bellegarda | G10L 15/1822 704/231 |
| 2008/0059186 A1* | 3/2008 | Mowatt | G10L 15/193 704/257 |

OTHER PUBLICATIONS

Office Action issued Feb. 24, 2015 in Japanese Application No. 2012-137844 (with English language translation).
Extended European Search Report issued Feb. 3, 2016 in Patent Application No. 13807663.3.
Violaine Prince, et al., "Text segmentation Based on Document Understanding for Information Retrieval" Natural Language Processing and Information Systems, Lecture Notes in Computer Science, vol. 4592, XP019095886, Jun. 27, 2007, pp. 295-304.
International Preliminary Report on Patentability and Written Opinion issued Dec. 31, 2014 in PCT/JP2013/064767.

* cited by examiner

|  | ASHITA | NO | TENKI | TOTAL |
|---|---|---|---|---|
| SCHEDULER | 350 | 0 | 0 | 210 |
| WEATHER FORECASTING | 100 | 0 | 200 | 260 |
| WEIGHT BASED ON POSITION | 0.6 | 0.8 | 1.0 | |

(b)

|  | ASHITA | NO | TENKI | TOTAL |
|---|---|---|---|---|
| SCHEDULER | 350 | 0 | 0 | 350 |
| WEATHER FORECASTING | 100 | 0 | 200 | 300 |

|  | weather | tomorrow | TOTAL |
|---|---|---|---|
| SCHEDULER | 0 | 350 | 175 |
| WEATHER FORECASTING | 200 | 100 | 250 |
| WEIGHT BASED ON POSITION | 1.0 | 0.5 |  |

(b)

|  | weather | tomorrow | TOTAL |
|---|---|---|---|
| SCHEDULER | 0 | 350 | 350 |
| WEATHER FORECASTING | 200 | 100 | 300 |

FUNCTION EXECUTION INSTRUCTION SYSTEM, FUNCTION EXECUTION INSTRUCTION METHOD, AND FUNCTION EXECUTION INSTRUCTION PROGRAM

CROSS-REFERENCE TO RELATED APPLICATIONS

The present application claims priority to Japanese Application No. 2012-137844, filed on Jun, 19, 2012.

TECHNICAL FIELD

The present invention relates to a function-execution instruction system, a function-execution instruction method, and a function-execution instruction program that can execute one or more functions.

BACKGROUND ART

Conventionally, systems have been known that recognize voices of users to perform functions on the basis of the recognized voices. For example, Patent Literature 1 discloses that whether a verb or a word expressing a feeling is contained in a recognition result of a user's voice is determined to generate a response based on this determination.

CITATION LIST

Patent Literature

[Patent Literature 1] Japanese Patent Application Laid-Open Publication No. 2009-198871

SUMMARY OF INVENTION

Technical Problem

However, an appropriate function cannot always be executed by merely extracting a verb or a word expressing a feeling from a recognition result of a user's voice. For example, when a user utters "Ashita No Tenki (Tomorrow's weather)", the user is considered to want to view a weather forecast, and accordingly the function of weather forecasting is desired to be executed. However, if words indicating dates are associated with a function of scheduler, a word indicating a date of "Ashita (tomorrow)" is contained in the utterance, so that the scheduler will be executed (activated). In other words, erroneous determination occurs.

When verbs are associated with functions and the user utters "Concert Wo Kiki Ni Iku Yotei Wo Tsukuru (To go and listen to a concert, make a schedule)", a plurality of verbs "Kiki (listen)", "Iku (go)", and "Tsukuru (make)" are contained therein. In such a case, whether to activate a function associated with any of the words cannot be appropriately determined.

The present invention has been made in view of the above-described problems, and an object thereof is to provide a function-execution instruction system, a function-execution instruction method, and a function-execution instruction program that can appropriately execute a function based on a plurality of words.

Solution to Problem

To achieve the above-described object, a function-execution instruction system according to one embodiment of the present invention includes function-execution instruction means for issuing an instruction of execution of one or more functions to be executed; word input means for inputting information containing a plurality of words that are arranged in order; and executed-function determination means for determining a function the execution of which is instructed by the function-execution instruction means among the one or more functions, based on the order of the words input by the word input means.

In the function-execution instruction system according to the embodiment of the present invention, a function the execution of which is instructed is determined in consideration of the order of the input words. Accordingly, words used for determining the function are appropriately used based on the order thereof. This enables the function-execution instruction system according to the embodiment of the present invention to appropriately execute a function based on a plurality of words.

The executed-function determination means may store therein associations of the one or more functions with predetermined words, extract the predetermined words from the words input by the word input means and, based on the associations and the order of the words extracted when being input by the word input means, determine a function the execution of which is instructed by the function-execution instruction means among the one or more functions. With this configuration, for example, even when a plurality of verbs for determining a function the execution of which is instructed are included in input words, the function the execution of which is instructed can be appropriately determined. The predetermined words may be verbs.

The executed-function determination means may store therein associations of the one or more functions with predetermined words, assign weights based on the order of the words input by the word input means to these words, and determine a function the execution of which is instructed by the function-execution instruction means among the one or more functions, based on the associations and the weights. With this configuration, even the same word is appropriately considered based on the order of words in determining a function. Thus, an appropriate function based on a plurality of words can be surely executed.

The function-execution instruction system may further include voice recognition means for receiving a voice, performing voice recognition on the voice thus received, and inputting a result of the voice recognition thus performed to the word input means. This configuration enables functions to be executed by user's voices.

The present invention can be described as an invention of the function-execution instruction system as describe above, and additionally the present invention can be described as inventions of a function-execution instruction method and a function-execution instruction program as described below. These are substantially the same inventions and similar actions and effects are exhibited while categories, for example, are merely different therebetween.

Specifically, a function-execution instruction method according to one embodiment of the present invention includes a function-execution instruction step of issuing an instruction of execution of one or more functions; a word input step of inputting information containing a plurality of words that are arranged in order; and an executed-function determination step of determining a function the execution of which is instructed at the function-execution instruction step among the one or more functions, based on the order of the words input at the word input step.

A function-execution instruction program according to one embodiment of the present invention causes a computer to function as function-execution instruction means for issuing an instruction of execution of one or more functions; word input means for inputting information containing a plurality of words that are arranged in order; and executed-function determination means for determining a function the execution of which is instructed by the function-execution instruction means among the one or more functions, based on the order of the words input by the word input means.

Advantageous Effects of Invention

In one embodiment of the present invention, because a function the execution of which is instructed is determined based on the order of input words, words used for determining the function are appropriately used based on the order thereof. Thus, according to the embodiment of the present invention, a function based on a plurality of words can be appropriately executed.

DESCRIPTION OF EMBODIMENTS

Embodiments of a function-execution instruction system, a function-execution instruction method, and a function-execution instruction program according to the present invention will be described in detail hereinafter with reference to the drawings. In the drawings, like reference signs are given to like elements, and duplicated explanations are omitted.

Figure 1:
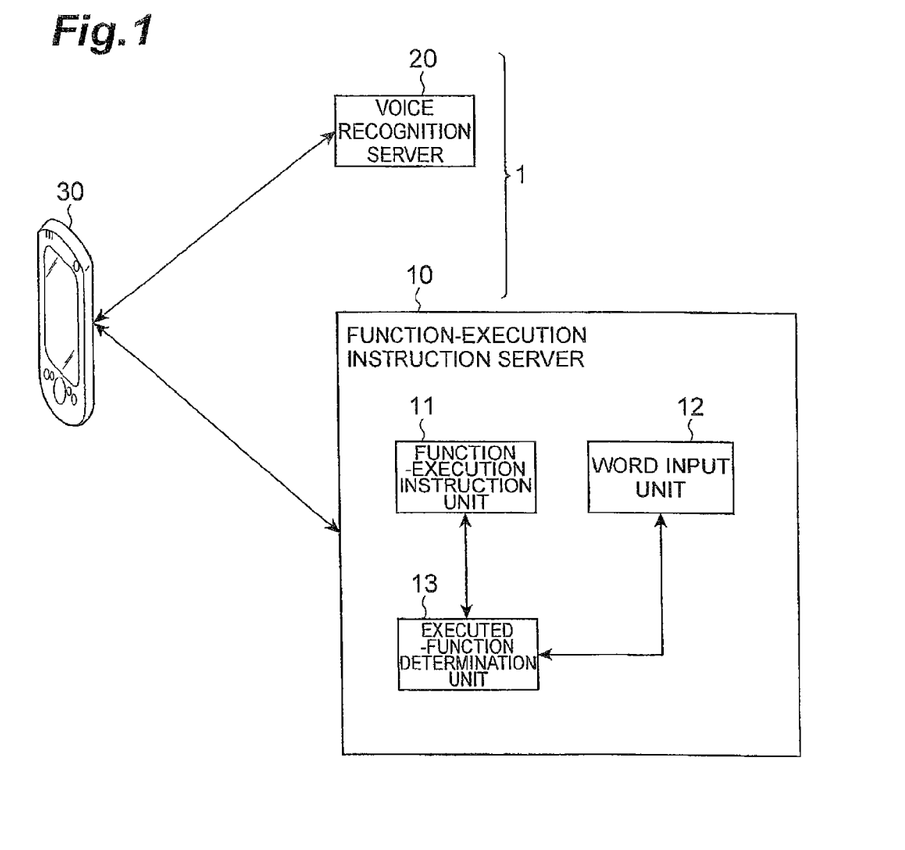
FIG. 1 is a diagram illustrating a configuration of a function-execution instruction system according to an embodiment of the present invention.

FIG. 1 illustrates a function-execution instruction system 1 according to a present embodiment. The function-execution instruction system 1 includes a function-execution instruction server 10 and a voice recognition server 20. The function-execution instruction system 1 is a system that instructs a communication terminal 30 to execute one or more preset functions. Examples of the functions that the function-execution instruction system 1 instructs the communication terminal 30 to execute include connection guidance, restaurant search, image search, music search, a music player, a scheduler, email, memo pad, route guidance, and map search. In the present embodiment, such executed functions are referred to as tasks. Specifically, for connection guidance, restaurant search, image search, music search, and map search, information on guidance and search results, for example, is displayed on the communication terminal 30.

The communication terminal 30 is a device that can communicate with the function-execution instruction server 10 and the voice recognition server 20 via a communication network (e.g., mobile communication network), and examples thereof include a mobile phone and a personal computer (PC). Because the above-described tasks are executed in response to user's voices as triggers, the communication terminal 30 has a function of receiving a voice of a user. The communication terminal 30 also has functions of receiving instructions from the function-execution instruction system 1 to execute the tasks, such as an information receiving function, an information processing function, and a display function.

In other words, the communication terminal 30 has function execution means for executing one or more (or a plurality of) tasks. Specifically, the communication terminal 30 stores application programs corresponding to the tasks in advance, and executes the tasks by executing (starting up) the stored application programs. The tasks executed by the communication terminal 30 are instructed by the function-execution instruction server 10 as described later. Execution of the tasks may be performed by acquiring information corresponding to the tasks via a network instead of executing the applications.

The function-execution instruction system 1 instructs the communication terminal 30 to execute the task in the following manner. To begin with, the communication terminal 30 inputs a voice of the user.

The input voice is transmitted from the communication terminal 30 to the voice recognition server 20. The voice recognition server 20 receives the voice from the communication terminal 30 and performs voice recognition on the received voice. The voice recognition server 20 transmits a sentence or a group of words that is a result of the voice recognition to the communication terminal 30. The communication terminal 30 receives the result of the voice recognition and further transmits the result to the function-execution instruction server 10. The function-execution instruction server 10 receives the result of the voice recognition, determines a task to be executed based on the result of the voice recognition, and instructs the communication terminal 30 to execute the task. For example, the function-execution instruction server 10 transmits information indicating the task to be executed to the communication terminal 30. The communication terminal 30 receives this instruction from the function-execution instruction server 10 and executes the task corresponding to the instruction. Alternatively, the sentence or the group of words that is the result of the voice recognition may be directly transmitted from the voice recognition server 20 to the function-execution instruction server 10 without once being transmitted to the communication terminal 30. Furthermore, the function-execution instruction server 10 and the voice recognition server 20 may be integrated.

For example, when the user of the communication terminal 30 utters "Ashita No Tenki (Tomorrow's weather)", the function-execution instruction server 10 determines to execute a task (task of weather forecasting) of searching weather of tomorrow for the current location of the communication terminal 30, and instructs the communication terminal 30 to execute the task of weather forecasting. In the case of executing the task of weather forecasting as described above, the current location of the communication terminal 30 is acquired when the task is executed. In this manner, depending on tasks, additional information is acquired as necessary.

The sentence or the group of words that is a result of the voice recognition is information containing a plurality of words that are arranged in order as described more specifically later. In other words, it is information by which the order (sequence, the position in the sentence) of the words contained therein is known. The foregoing is a general description of the function-execution instruction system 1 according to the present embodiment.

The following describes a function of the function-execution instruction system 1 according to the present embodiment. The voice recognition server 20 is a device that is voice recognition means for receiving a voice, performing voice recognition on the received voice, and outputting a result of performing the voice recognition. Specifically, the voice recognition server 20 receives voice data from the communication terminal 30 as described above. The voice recognition server 20 has a voice recognition engine, and performs voice recognition using the voice recognition engine. For the voice recognition, any conventional voice recognition methods can be used. The voice recognition server 20 acquires the result of the voice recognition as a group of words (word group including two or more words) or a sentence, and transmits the result to the communication terminal 30. The voice recognition result herein is information with which the order of words contained therein can be identified. For example, the voice recognition result is information in which words contained in the voice recognition result are serially arranged according to the order.

As depicted in FIG. 1, the function-execution instruction server 10 includes a function-execution instruction unit 11, a word input unit 12, an executed-function determination unit 13.

The function-execution instruction unit 11 is function-execution instruction means for issuing an instruction of execution of one or a plurality of tasks to the communication terminal 30. Specifically, the function-execution instruction unit 11 instructs the tasks to be executed by transmitting commands to execute the tasks to the communication terminal 30. A task the execution of which is instructed by the function-execution instruction unit 11 is determined by the executed-function determination unit 13 as described later.

The task the execution of which is instructed involves a function of using a word as an input (argument). This is called a slot of a task. The slot is set in advance. For example, in the case of the task of weather forecasting, a slot is provided to which a targeted time (today, tomorrow, one week) or a targeted area is input. It should be noted that zero or more slots are defined for each task. In other words, some tasks have no slots. With each slot, information may be associated that indicates whether a predetermined word (default word) is input when no words are input to the slot. For example, in the case of weather forecasting, for the targeted area, the current location of the user that is acquired with a global positioning system (GPS), for example, may be input as the default word.

The word input unit 12 is word input means for inputting information containing a plurality of words that are arranged in order. Specifically, the word input unit 12 receives information indicating a plurality of words that are arranged in order as a result of voice recognition performed by the voice recognition server 20 from the communication terminal 30 to input this information. Alternatively, when the result of voice recognition performed by the voice recognition server 20 is a sentence (input sentence), the word input unit 12 receives the sentence, and extracts words from the sentence or divides the sentence into words to acquire the words and identify the order of the words. As a method of acquiring the words from the sentence, any conventional methods such as morphological analysis using a morpheme dictionary can be used. The words are input to the word input unit 12 on an utterance-by-utterance basis of the user to the communication terminal 30. In other words, a group of words included in one utterance is dealt with as one unit. The word input unit 12 inputs the information indicating the words arranged in the order thus acquired to the executed-function determination unit 13.

The executed-function determination unit 13 is executed-function determination means for determining a task the execution of which is instructed by the function-execution instruction unit 11 on the basis of the order of words input by the word input unit 12. For example, the executed-function determination unit 13 stores therein associations of tasks with predetermined words, and determines the function the execution of which is instructed based on these associations and the words arranged in the order. Specifically, the executed-function determination unit 13 stores therein scores of words for each task. As an example of the score of words for each task, for the task of "scheduler", a score of 350 is associated with the word "Ashita (tomorrow)". For the task of "weather forecasting", scores of 100 and 200 are associated with the words "Ashita (tomorrow)" and "Tenki (weather)", respectively. The executed-function determination unit 13 assigns weights based on the order of the input words to these words, and identifies the score of a word group input on an utterance-by-utterance basis of the user in consideration of the weights, and determines a function to be executed based on the identified score. These weights are set in advance and stored in the executed-function determination unit 13. The weights may depend on the number of words or the language of the words. Information indicating these associations and the weights is input and stored, for example, in the function-execution instruction server 10 in advance by an operator, for example, of the function-execution instruction system 1.

Figure 2:
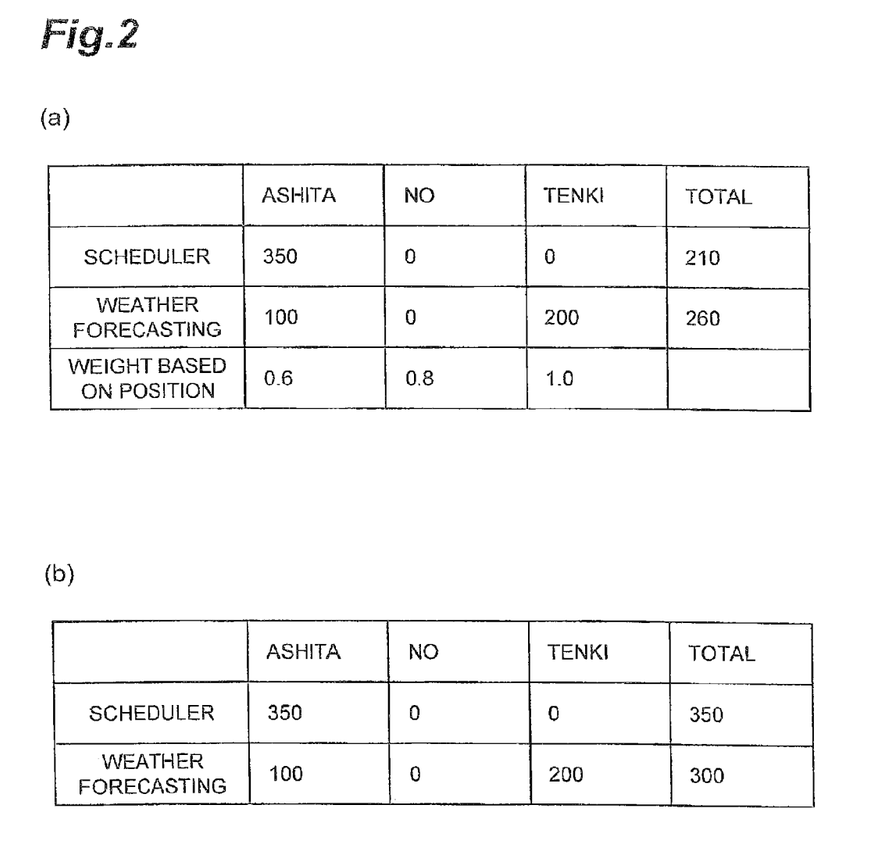
FIG. 2 is a table illustrating scores for each task when the user utters "Ashita No Tenki (Tomorrow's weather)".

For example, it is assumed that the user utters "Ashita No Tenki (Tomorrow's weather)". In this case, as depicted in FIG. 2, this utterance of the user is divided into three words in the order of "Ashita", "No", and "Tenki". In this case of three words, for example, weights based on the positions are set in advance as 0.6 for the first word, 0.8 for the second word, and 1.0 for the last word as depicted in FIG. 2(*a*). In Japanese language, because an important word is more likely to be positioned on the more posterior side in a sentence, a heavier weight may be assigned to a more posterior word. When the user utters "Ashita No Tenki (Tomorrow's weather)", the user is considered to want to know the weather, and thus the word "Tenki (weather)" positioned on the posterior side is more important than the word "Ashita (tomorrow)" positioned on the anterior side.

Subsequently, scores for the respective words are identified based on the above-described associations for each task, these scores are multiplied by weights based on the positions of the words, and the weighted scores are summed up to calculate a score for each task. The weighted scores are identified for the respective words as depicted in FIG. 2(*a*) and are summed up, whereby scores for each task (tasks of "scheduler" and "weather forecasting" in the example of FIG. 2(*a*)) are summed up. The scores of words for each task are set depending on the degree of relation with each task. The scores of words for each task may be set on a category-by-category basis (for each category) after categorizing the words instead of by individual words. For example, with the task of "connection guidance", the score for the category of station (group of words consisting of station names) may be associated. In this case, to what categories the respective words contained in the utterance of the user belong are identified, and scores are calculated by comparing the identified categories with the categories associated with the respective tasks.

The executed-function determination unit 13 determines, for example, a task obtaining the highest score as a task the execution of which is instructed by the function-execution instruction unit 11 (or a task candidate the execution of which is instructed). In the example depicted in FIG. 2(a), because the task of "weather forecasting" scores 260 and the task of "scheduler" scores 210, the task of "weather forecasting" obtaining the higher score is determined to be a task the execution of which is instructed. The executed-function determination unit 13 notifies the function-execution instruction unit 11 of the task thus determined. After this notification, the function-execution instruction unit 11 instructs the communication terminal 30 to execute the task.

At this instruction, the communication terminal 30 may be also notified of a word that is an input to the slot of the task to be executed (a word that can be input to the category) out of the words input by the word input unit 12. The word that is an input to the slot is also transmitted from the function-execution instruction unit 11 to the communication terminal 30 together with the instruction to execute the task. For example, when the task of "weather forecasting" is executed in response to the utterance of "Ashita No Tenki (Tomorrow's weather)", the word "Ashita (tomorrow)" indicating the targeted time for the weather forecasting is used as an input to the slot of the "weather forecasting". To the slot of the targeted area for the weather forecasting, the current location of the user may be input as a default word. This causes the weather of tomorrow in the current location of the user be searched, and the result is presented to the user. When the input to the slot is insufficient to execute the task, the user may be encouraged to input to the slot at that time so that a word is input to the slot again.

As described above, the executed-function determination unit 13 calculates weighted scores for the respective words to determine a task to be executed. Herein, an example is taken up in which scores are calculated without assigning weights for the respective positions of words. FIG. 2(b) illustrates an example (comparative example of the present embodiment) in which scores are calculated without assigning weights in contrast to the example of score calculation depicted in FIG. 2(a). When weights are not assigned as depicted in FIG. 2(b), the task of "scheduler" scores 350, and the task of "weather forecasting" scores 300. In this case, the task of "scheduler" obtains the higher score, so that the "scheduler" is determined to be a task to be executed. In the case that the user utters "Ashita No Tenki (Tomorrow's weather)" as described above, because the user is considered to want to know the weather, an appropriate task cannot be executed (erroneous determination occurs) when scores to which weights based on positions are not assigned are used.

In the above-described example, it is also considered that the above-described result is obtained because the score of the word "Ashita (tomorrow)" itself is high in the "scheduler". However, to search sports news in response to an utterance "Golf No Kekka (Golf results)" and to execute a scheduler in response to an utterance "Ashita Ha Golf (Tomorrow, golf)", the score of the word "Ashita (tomorrow)" for the "scheduler" needs to be set high. Thus, erroneous determination cannot be avoided by merely combining (adjusting) scores of words without assigning weights as in the present embodiment. In other words, by assigning weights in consideration of the positions of words (order of words) as in the present embodiment, a task the execution of which is instructed can be appropriately determined.

Figure 3:
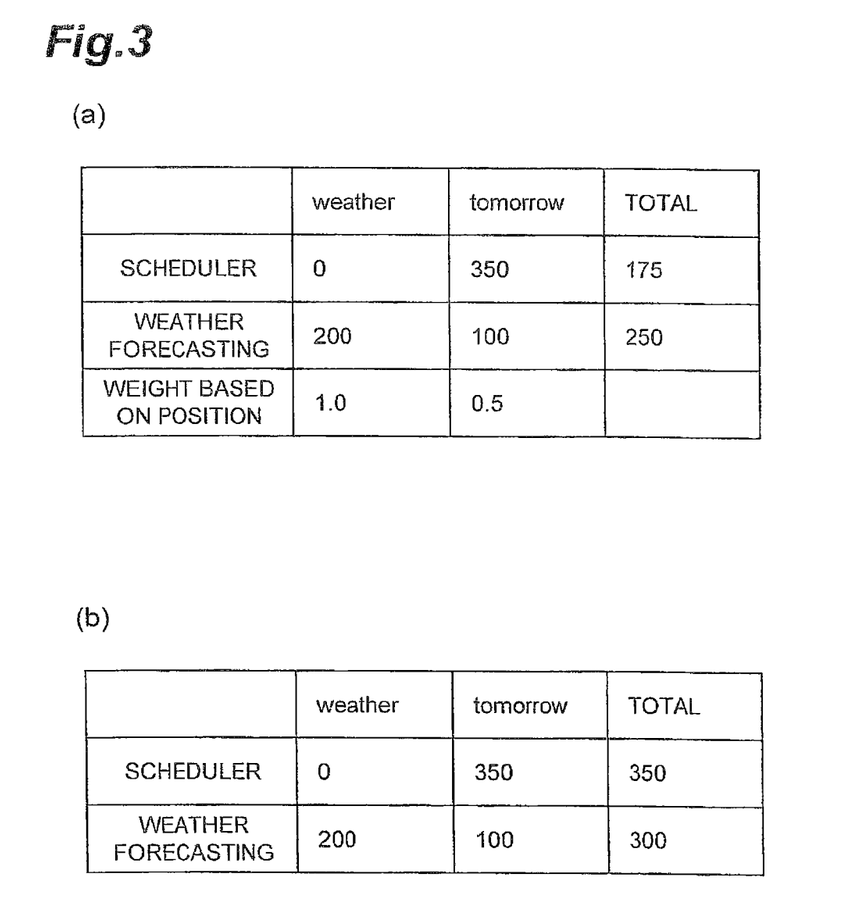
FIG. 3 is a table illustrating scores for each task when the user utters "weather tomorrow".

FIG. 3 illustrates another example. For example, it is assumed that the user utters "weather tomorrow". In this case, as depicted in FIG. 2, the utterance of the user is divided into two words in the order of "weather" and "tomorrow". In this example, the number of words is two and the language is English. In this case, the weights based on the positions are set in advance to be 1.0 for the first word and 0.5 for the last word as depicted in FIG. 3(a), for example. In English (Western European language) differently from Japanese, because an important word is more likely to be positioned on the more anterior side in a sentence, a heavier weight may be assigned to a more anterior word. When the user utters "weather tomorrow", the user is considered to want to know the weather similarly to the example in Japanese, the latter word "tomorrow" is more important than the latter word "weather".

In this case (example of the present embodiment), as depicted in FIG. 3(a), because the task of "weather forecasting" scores 250 and the task of "scheduler" scores 175, the task of "weather forecasting" obtaining the higher score is determined to be a task the execution of which is instructed. In other words, in this case, a task to be executed is appropriately determined.

In contrast, when scores are calculated without assigning weights for the respective positions of words (comparative example of the present embodiment), the task of "scheduler" scores 350 and the task of "weather forecasting" scores 300 as depicted in FIG. 3(b). In this case, the task of "scheduler" obtains the higher score, so that the "scheduler" is determined to be a task to be executed. As described above, also in this example, appropriate task cannot be executed (erroneous determination occurs) when scores to which weights based on positions are not assigned are used. The foregoing has described functions of the executed-function determination unit 13 that determines a task the execution of which is instructed on the basis of weights based on the order of words.

The executed-function determination unit 13 may determine a task the execution of which is instructed in the following manner. The executed-function determination unit 13 stores therein associations of tasks with predetermined words. The predetermined words are, for example, words in a preset type, such as verbs. Verbs that are closely related to the respective tasks or verbs indicating the tasks are associated with the respective tasks. With tasks of image search and various searches, verbs "watch, look, . . . " are associated. With tasks of music search and a music player, verbs "hear, listen to, . . . " are associated.

With tasks of scheduler, email, and memo pad, verbs "make, cook, create, write, . . . " are associated. With tasks of route guidance and connection guidance, a verb "go" is associated. Herein, a plurality of verbs may be associated with one task, or one verb may be associated with a plurality of tasks. Information indicating these associations is input and stored, for example, in the function-execution instruction server 10 in advance by an operator, for example, of the function-execution instruction system 1.

The executed-function determination unit 13 extracts the above-described predetermined words (verbs) from words input by the word input unit 12. Based on words in the order set in advance out of the extracted words and the above-described associations, the executed-function determination unit 13 determines a task the execution of which is instructed by the function-execution instruction unit 11. Specifically, when a plurality of verbs are extracted, from the words, a word to be used for determination of the task is determined based on the order of the words. This determination may depend on the language of the input words.

When the input words are Japanese, out of the extracted verbs, a verb that is the most posterior in order (an independent word that comes lastly) is determined to be the word to be used for determination of the task. For example, when the user utters "Concert Wo Kiki Ni Iku Yotei Wo Tsukuru (To go and listen to a concert, make a schedule)", three verbs "Kiki (listen)", "Iku (go)", and "Tsukuru (make)" are extracted.

Among these verbs, the verb "Tsukuru (make)" that is the most posterior in order is determined to be the word to be used for determination of the task. If the number of the extracted words is one, this single word is determined to be the word to be used for determination of the task.

The executed-function determination unit 13 determines a task associated with a verb that is determined to be used for determination of the task as a task to be determined. If a plurality of tasks are associated with one verb, these tasks are used as candidates to be executed, and a task the execution of which is instructed is determined out of these candidates by another method. For example, for these candidates, scores based on the above-described words are calculated, and the task to be executed is determined based on the scores. In the above-described example, the tasks of "scheduler", "email", and "memo pad" that are associated with the verb "Tsukuru (make)" are determined to be the candidates to be executed.

In the case of Japanese language as in the above-described example, a verb that is most closely related to the intension of a sentence is generally a verb that comes lastly. In this manner, a verb that comes lastly is determined to be a main action that is intended by the sentence (utterance of the user), whereby accuracy of determining a task the execution of which is instructed can be improved.

In contrast, in the case of English (Western European language), a verb (independent word) that comes first is determined to be a verb to be used for determination of the task. This is because, in English, a verb that is closely related to the intension of a sentence is generally a verb that comes first. For example, when the user utters "Make a schedule to go a concert", two verbs "Make" and "go" are extracted, and the "Make" that comes first is used for determination of the task, whereby not a task of route guidance, for example, that is associated with the "go" but a task of making a schedule, for example, can be determined.

The above-described determination may be performed by using words other than verbs. Specifically, keywords that are closely related to tasks (strong keywords) may be preset similarly to the above-described verbs, and a task may be determined by using a word that comes lastly (in the case of Japanese language) out of the keywords extracted. For example, when the user utters "Atsuryokunabe No Recipe Hon Ga Mitainaa (I want to read a recipe book for pressure cookers)", as keywords that are closely related to tasks, two words "Recipe" and "Hon (book)" are extracted. The "Recipe" and the "Hon (book)" are words (keywords) that are associated with the task of "recipe search" and the task of "book search", respectively. The above-described utterance of the user is intended to search a book, so that the last keyword "Hon (book)" has a priority over the preceding keyword "Recipe". Examples of the strong keywords include a word "Norikae (connection)" that is associated with the task of "connection guidance" in addition to the above-described keywords. The foregoing has described functions of the executed-function determination unit 13 that determines a word to be used for determination of a task on the basis of the order of predetermined words, and determines a task the execution of which is instructed. The foregoing has described a functional configuration of the function-execution instruction system 1 according to the present embodiment.

Figure 4:
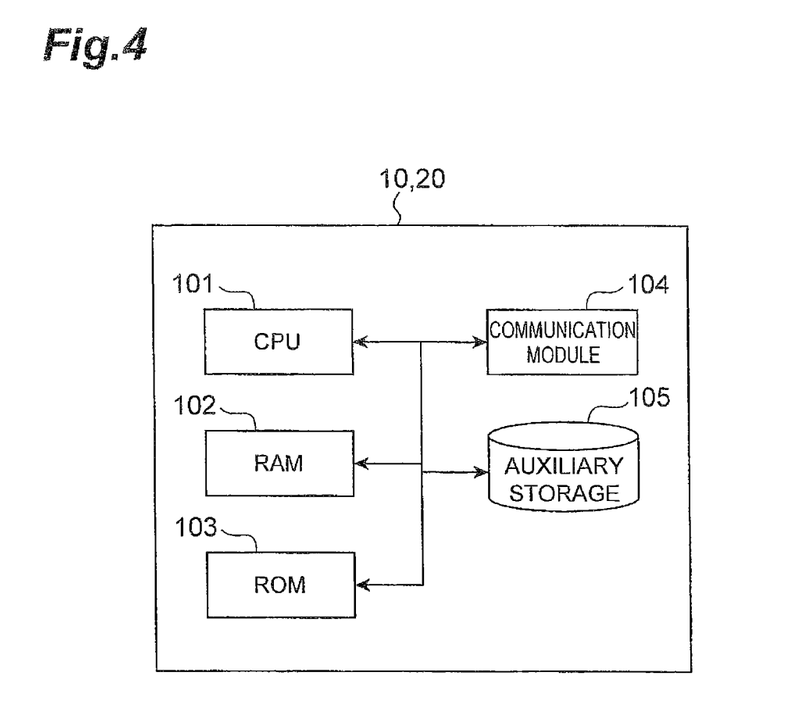
FIG. 4 is a diagram illustrating a hardware configuration of a function-execution instruction server and a voice recognition server constituting the function-execution instruction system according to the embodiment of the present invention.

FIG. 4 illustrates a hardware configuration of a server device constituting the function-execution instruction server 10 and the voice recognition server 20 according to the present embodiment. As depicted in FIG. 4, the server device includes a computer provided with hardware such as a central processing unit (CPU) 101, a random access memory (RAM) 102 and a read only memory (ROM) 103 being main memories, a communication module 104 for performing communication, and an auxiliary storage 105 such as a hard disk. These components are operated by a program, for example, whereby functions of the function-execution instruction server 10 and the voice recognition server 20 described above are implemented. The foregoing has described the configuration of the function-execution instruction system 1 according to the present embodiment.

Figure 5:
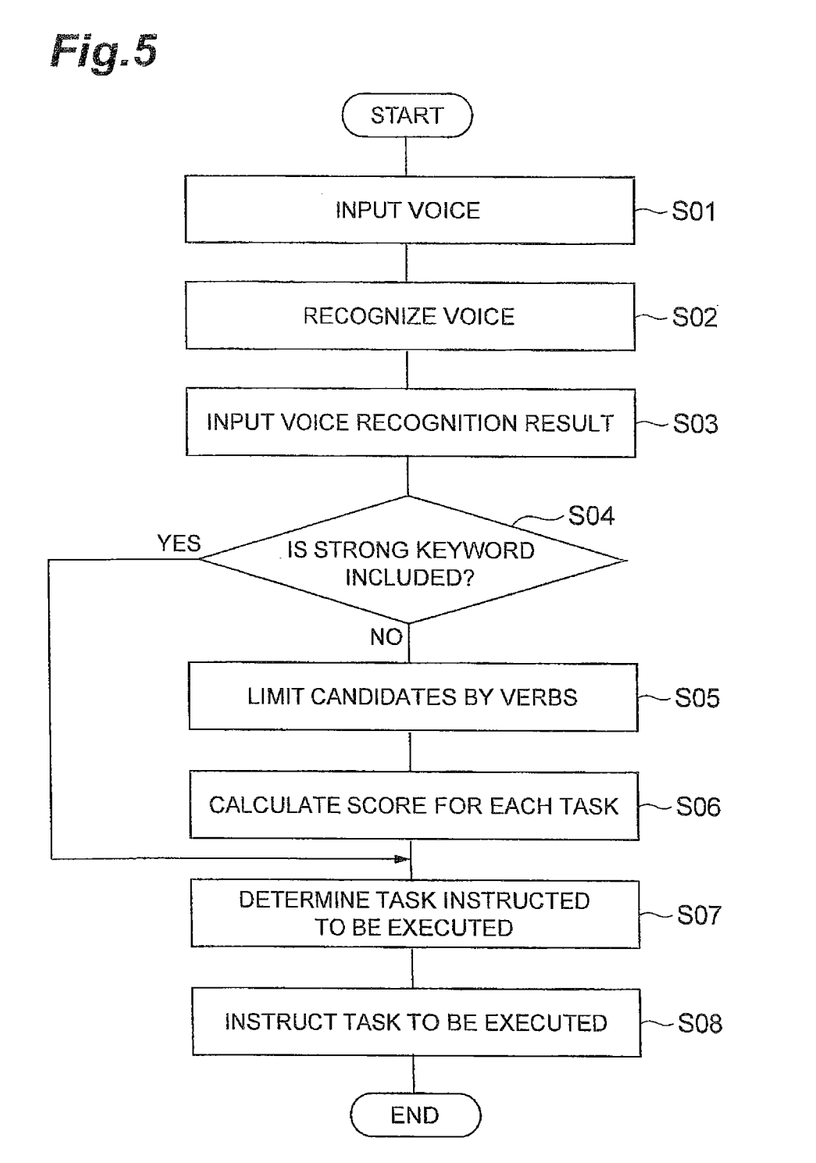
FIG. 5 is a flowchart illustrating processes (function-execution instruction method) executed in the function-execution instruction system according to an embodiment of the present invention.

The following describes the function-execution instruction method that is processing executed in the function-execution instruction system 1 according to the present embodiment with reference to the flowchart in FIG. 5. In this processing, to begin with, user operation of the communication terminal 30 is performed to receive an instruction for function execution by the function-execution instruction system 1 according to the present embodiment, and a voice (utterance) of the user to execute a function is input to the communication terminal 30. Subsequently, the voice is transmitted from the communication terminal 30 to the voice recognition server 20. In the voice recognition server 20, the voice is received and input (S01, voice recognition step). Subsequently, the voice recognition server 20 performs voice recognition on the input voice (S02, voice recognition step). Information indicating a group of words or a sentence that is a voice recognition result is transmitted from the voice recognition server 20 to the communication terminal 30. Information indicating a group of words or a sentence is information of words that are arranged in order. The communication terminal 30 receives the information and transmits the information to the function-execution instruction server 10.

In the function-execution instruction server 10, the word input unit 12 receives and input information containing a plurality of words arranged in order as a voice recognition result (S03, word input step). The input information is output from the word input unit 12 to the executed-function determination unit 13. Subsequently, the executed-function determination unit 13 determines whether a preset strong keyword is included in the words arranged in order contained in the input information (extracts a strong keyword) (S04, executed-function determination step). If it is determined that a strong keyword is included (YES at S04), a task that is associated with the strong keyword is determined to be a task the execution of which is instructed (S07, executed-function determination step). When a plurality of strong words are included in the input words, out of these keywords, a keyword is determined that is used to determine the task the execution of which is instructed based on the order of the words.

If it is determined that a strong keyword is not included (NO at S04), the executed-function determination unit 13 subsequently extracts predetermined verbs from the plurality of words arranged in order contained in the input information. Verbs that are associated with the extracted verbs are determined to be candidates for the task the execution of which is instructed (candidates for the task to be executed are limited) (S05, executed-function determination step). When a plurality of verbs are included in the input words, out of these verbs, a verb is determined that is used to determine the task the execution of which is instructed based on the order of the words. When the predetermined verbs are not included in the input words, candidates for the task the execution of which is instructed are not limited, and all tasks are considered to be candidates for the task the execution of which is instructed.

Subsequently, with respect to the tasks determined to be candidates for the task the execution of which is instructed, the executed-function determination unit 13 calculates a score for each task (S06, executed-function determination step). The score for each task is calculated on the basis of the input words by assigning weights based on the order of the words as described with reference to FIGS. 2 and 3. Subsequently, the executed-function determination unit 13 determines a task obtaining the highest score as the task the execution of which is instructed (S07, executed-function determination step).

Subsequently, the executed-function determination unit 13 instructs the function-execution instruction unit 11 to issue an instruction of the execution of the determined task. At this time, the words input to the slots of the task are also output to the function-execution instruction unit 11. Subsequently, the function-execution instruction unit 11 thus instructed instructs the communication terminal 30 to execute the task (S08, function-execution instruction step). The communication terminal 30 receives this instruction and executes the task of the instruction. The foregoing has described the function-execution instruction method that is processing performed in the function-execution instruction system 1 according to the present embodiment.

As described above, in the present embodiment, based on the order of the input words, a task the execution of which is instructed is determined. Accordingly, words that are used to determine the task are appropriately used based on the order of the words in consideration of the intension of the user. Thus, according to the present embodiment, a function based on a plurality of words can be appropriately executed.

More specifically, as in the present embodiment, it is preferable to assign weights to words on the basis of the order of the words and determine a task the execution of which is instructed. With this configuration, even the same word is appropriately considered based on the order of words in determining the task. Thus, an appropriate task based on a plurality of words can be surely executed. In other words, a task intended by the user can be executed. For example, as described in the above-described example of "Ashita No Tenki (Tomorrow's weather)", the task of "schedule" that is not intended by the user is prevented from being executed, and the task of "weather forecasting" intended by the user is executed.

It is also preferable to extract certain preset words such as verbs as in the present embodiment, and determine a word for a task the execution of which is instructed based on the order of the words out of the extracted words. With this configuration, for example, even when a plurality of verbs for determining a task the execution of which is instructed are included in input words, a task the execution of which is instructed can be appropriately determined. In other words, a task intended by the user can be executed. For example, as described in the above-described example of "Concert Wo Kiki Ni Iku Yotei Wo Tsukuru (To go and listen to a concert, make a schedule)", tasks including the task of "scheduler" intended by the user can be determined to be candidates for the task the execution of which is instructed. Furthermore, when a task the execution of which is instructed is determined by using a strong keyword, a task intended by the user can be determined.

As in the present embodiment, by receiving voice and performing voice recognition, the result of the voice recognition may be used as info nation containing input words. With this configuration, functions can be executed based on voices of the user.

Although the present embodiment has described that the function-execution instruction system 1 includes the voice recognition server 20, the function-execution instruction system 1 does not necessarily have to include the voice recognition server 20. In this case, the result of voice recognition, or a word group or a sentence that is not based on the voice recognition is input to the function-execution instruction system 1. Although the present embodiment has described that the function-execution instruction server 10 and the voice recognition server 20 are configured as separate components, these servers may be configured as an integrated component. In this case, the result of voice recognition does not have to be transmitted or received via the communication terminal 30. A terminal used by the user, such as the communication terminal 30, may have the functions of the function-execution instruction server 10 or the voice recognition server 20. In this case, this terminal serves as a function-execution instruction system according to one embodiment of the present invention. Alternatively, the function-execution instruction server 10 may have a function of executing tasks, and may be configured to provide the result of task execution to the communication terminal 30.

Figure 6:
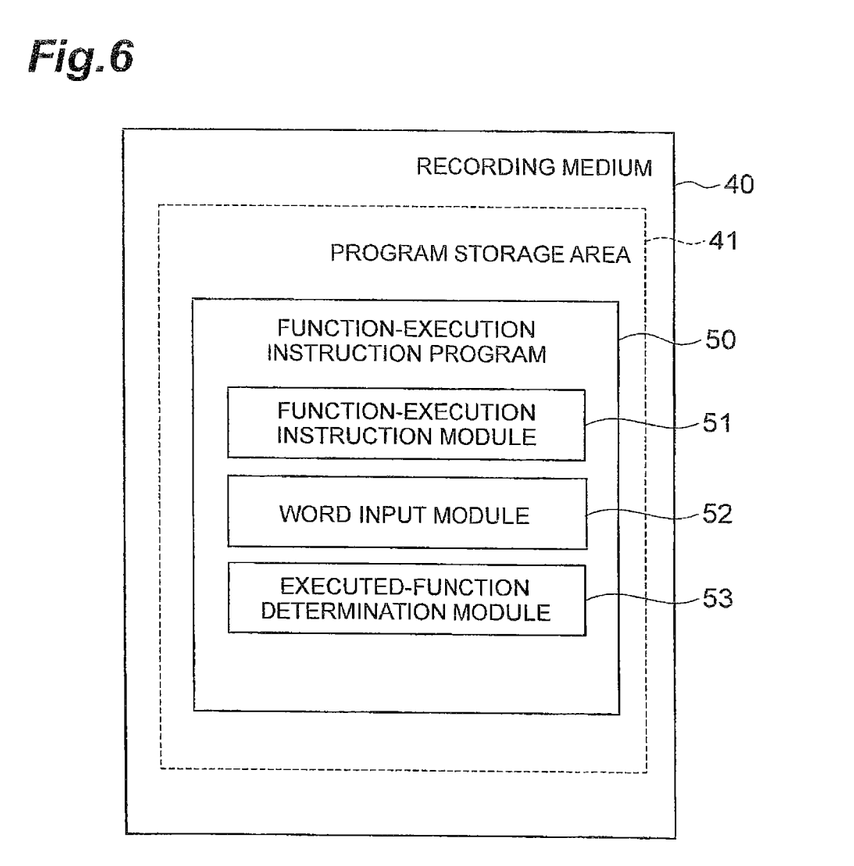
FIG. 6 is a diagram illustrating a configuration of a function-execution instruction program according to an embodiment of the present invention with a recording medium.

The following describes the function-execution instruction program causing a computer to execute the above-described series of processes performed by the function-execution instruction server 10. As depicted in FIG. 6, this function-execution instruction program 50 is stored in a program storage area 41 formed in a recording medium 40 that is inserted into the computer and accessed or is included in the computer.

The function-execution instruction program 50 includes a function execution module 51, a word input module 52, and an executed-function determination module 53. Functions implemented by causing the function execution module 51, the word input module 52, and the executed-function determination module 53 to operate are the same as the above-described functions of the function-execution instruction unit 11, the word input unit 12, and the executed-function determination unit 13 of the function-execution instruction server 10, respectively. The function-execution instruction program 50 may include a module corresponding to the function of the voice recognition server 20.

It should be noted that the function-execution instruction program 50 may be configured so that part or all thereof is transmitted via a transmission medium such as a communication line and is received and recorded (including installation) by another device. Furthermore, the respective modules of the function-execution instruction program 50 may be installed in any of a plurality of computers instead of one computer. In this case, the above-described series of processes of the function-execution instruction program 50 are performed by a computer system including the computers.

REFERENCE SIGNS LIST

1 . . . function-execution instruction system, 10 . . . function-execution instruction server, 11 . . . function-execution instruction unit, 12 . . . word input unit, 13 . . . executed-function determination unit, 20 . . . voice recognition server, 101 . . . CPU, 102 . . . RAM, 103 . . . ROM, 104 . . . communication module, 105 . . . auxiliary storage, 30 . . . communication terminal, 40 . . . recording medium, 41 . . . program storage area, 50 . . . function-execution instruction program, 51 . . . function execution module, 52 . . . word input module, 53 . . . executed-function determination module.

The invention claimed is:

1. A function-execution instruction system comprising: circuitry configured to:
  store, for each of one or more functions, an association with corresponding predetermined words;
  store scores of the predetermined words associated with the one or more functions;
  receive input information containing a plurality of words that are arranged in an order;

assign a weight to each of the plurality of words according to the order of the plurality of words in the input information;

identify, for each word of the plurality of words, a score according to the scores of the predetermined words;

determine a plurality of weighted scores for the plurality of words, each weighted score for the each word of the plurality of words being determined by multiplying the score and the weight of the each word of the plurality of words;

calculate a final score for the each of the one or more functions by summing up the plurality of weighted scores for the plurality of words;

determine a function among the one or more functions to be executed, based on the final score and the associations; and issue an instruction to execute the determined function.

2. The function-execution instruction system according to claim 1, wherein the circuitry is further configured to extract the predetermined words from the plurality of words and, based on the associations and the order of the words extracted when being input, to determine a function the execution of which is instructed among the one or more functions.

3. The function-execution instruction system according to claim 2, wherein the predetermined words are verbs.

4. The function-execution instruction system according to claim 1, wherein the circuitry is further configured to receive a voice, to perform voice recognition on the voice thus received, and to input a result of the voice recognition thus performed.

5. The function-execution instruction system according to claim 1, wherein the circuitry is further configured to assign the weight to each of the plurality of words according to a number of words in the plurality of words of the input information.

6. A function-execution instruction method comprising:

storing, by circuitry of a function-execution instruction system, for each of one or more functions, an association with corresponding predetermined words;

storing, by the circuitry, scores of the predetermined words associated with the one or more functions;

receiving, by the circuitry, input information containing a plurality of words that are arranged in an order;

assigning, by the circuitry, a weight to each of the plurality of words according to the order of the plurality of words in the input information;

identifying, by the circuitry, for each word of the plurality of words, a score according to the scores of the predetermined words;

determining, by the circuitry, a plurality of weighted scores for the plurality of words, each weighted score for the each word of the plurality of words being determined by multiplying the score and the weight of the each word of the plurality of words;

calculating, by the circuitry, a final score for the each of the one or more functions by summing up the plurality of weighted scores for the plurality of words;

determining, by the circuitry, a function among the one or more functions to be executed, based on the final score and the associations; and issuing, by the circuitry, an instruction to execute the determined function.

7. A non-transitory computer readable medium storing computer executable instructions including a function-execution instruction program that, when executed by a function-execution instruction system including circuitry, causes the circuitry to:

store, for each of one or more functions, an association with corresponding predetermined words;

store scores of the predetermined words associated with the one or more functions;

receive input information containing a plurality of words that are arranged in an order;

assign a weight to each of the plurality of words according to the order of the plurality of words in the input information;

identify, for each word of the plurality of words, a score according to the scores of the predetermined words;

determine a plurality of weighted scores for the plurality of words, each weighted score for the each word of the plurality of words being determined by multiplying the score and the weight of the each word of the plurality of words;

calculate a final score for the each of the one or more functions by summing up the plurality of weighted scores for the plurality of words;

determine a function among the one or more functions to be executed, based on the final score and the associations; and issue an instruction to execute the determined function.

* * * * *